United States Patent
Burke et al.

(10) Patent No.: US 6,996,067 B1
(45) Date of Patent: Feb. 7, 2006

(54) APPARATUS FOR AND METHOD OF PROVIDING AND MEASURING DATA THROUGHPUT TO AND FROM A PACKET DATA NETWORK

(75) Inventors: John L. Burke, Joppatowne, MD (US); Steve O. Akinsola, Stamford, CT (US); Keith Yendall, Ellicott City, MD (US); Ron Hudson, Newark, DE (US); Leo Washenfeldt, Bel Air, MD (US); Roman Krzanowski, White Plains, NY (US); John Capps, Abington, PA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/455,517

(22) Filed: Dec. 7, 1999

(51) Int. Cl.
   *H04J 1/16* (2006.01)
(52) U.S. Cl. .................... 370/248; 370/252
(58) Field of Classification Search ............... 370/232, 370/241, 242, 248, 252, 253; 714/1, 25, 714/27, 30, 31, 32, 33, 35, 37, 45, 712; 375/224, 375/225; 379/1.01, 1.03, 2.3, 93.01, 9.03
   See application file for complete search history.

(56) References Cited

U.S. PATENT DOCUMENTS

| | | | |
|---|---|---|---|
| 4,103,108 A | * | 7/1978 | Munter .................... 370/252 |
| 4,750,175 A | * | 6/1988 | Brenneman et al. ........ 370/216 |
| 5,495,470 A | * | 2/1996 | Tyburski et al. .......... 370/248 |
| 5,608,557 A | | 3/1997 | Farry et al. |
| 5,682,419 A | * | 10/1997 | Grube et al. .............. 455/450 |
| 5,751,702 A | * | 5/1998 | Evans et al. ............... 370/314 |
| 5,768,260 A | * | 6/1998 | Lindgren et al. ........... 370/252 |
| 5,802,052 A | * | 9/1998 | Venkataraman ........ 370/395.72 |
| 5,812,786 A | | 9/1998 | Seazholtz et al. |
| 5,818,511 A | | 10/1998 | Farry et al. |
| 6,002,671 A | * | 12/1999 | Kahkoska et al. .......... 370/248 |
| 6,005,696 A | * | 12/1999 | Joline et al. ................. 398/25 |
| 6,005,873 A | * | 12/1999 | Amit .......................... 370/494 |
| 6,021,439 A | * | 2/2000 | Turek et al. ................ 709/224 |
| 6,031,899 A | * | 2/2000 | Wu ........................ 379/142.01 |
| 6,058,161 A | * | 5/2000 | Anderson et al. ........ 379/22.03 |
| 6,064,730 A | * | 5/2000 | Ginsberg ................ 379/265.09 |
| 6,075,784 A | * | 6/2000 | Frankel et al. .............. 370/356 |
| 6,081,530 A | * | 6/2000 | Wiher et al. ........... 370/395.53 |

(Continued)

*Primary Examiner*—Huy D. Vu
*Assistant Examiner*—Daniel Ryman
(74) *Attorney, Agent, or Firm*—Leonard C. Suchyta, Esq.; Joseph R. Palmierl, Esq.; Fullbright & Jaworski LLP

(57) ABSTRACT

A digital subscriber link data network incorporates a throughput test server (TTS) to provide fault identification, isolation, and verification of DSL service availability and data rates. An asymmetric digital subscriber line (ADSL) terminal unit—remote (ATU-R) is connected to an ADSL terminal unit—central office (ATU-C) over a conventional copper loop or equivalent. Data connectivity via a packet switch provides access to high speed data networks, TTS connectivity and interfaces to service providers (SPS). Upon receiving a test request, a technician routes a customer to the TTS. The customer uses a web browser to access the TTS and download executable testing software, e.g., a JAVA applet. The applet causes test messages to be sent to and received from the TTS and computes upstream and downstream data rates that is displayed to the customer together with whether the measured data rates are consistent with a specified class of service.

44 Claims, 11 Drawing Sheets

U.S. PATENT DOCUMENTS

| | | | |
|---|---|---|---|
| 6,173,332 B1 * | 1/2001 | Hickman | 709/235 |
| 6,195,356 B1 * | 2/2001 | Anello et al. | 370/398 |
| 6,215,855 B1 * | 4/2001 | Schneider | 379/22 |
| 6,223,221 B1 * | 4/2001 | Kunz | 709/224 |
| 6,480,487 B1 * | 11/2002 | Wegleitner et al. | 370/354 |
| 6,493,425 B1 * | 12/2002 | Abe | 379/1.01 |

* cited by examiner

APPARATUS FOR AND METHOD OF PROVIDING AND MEASURING DATA THROUGHPUT TO AND FROM A PACKET DATA NETWORK

FIELD OF THE INVENTION

The invention relates to a packet data network and, in particular a system for and method of providing high speed local loop access throughput testing.

DESCRIPTION OF THE RELATED TECHNOLOGY

With the proliferation of personal computers, there has been increasing attention on providing data connectivity for these systems. Interconnection allows remote systems to access central and widely distributed databases and supports distributed processing architectures combining the resources of centralized and remote systems. Such interconnections often take the form of a computer network. While a local area network (LAN) is well suited to interconnect multiple computers at a particular site where special cabling can be installed, providing connectivity between LANs and to individual computers at diverse locations (such as into the home) has been a problem.

While many solutions have been proposed, implementations using existing systems such as the embedded telephone network infrastructure tend to be less costly and require less time to deploy. In particular, the embedded telephone plant already includes extensive facilities supporting communication from central relay and switching facilities to most homes and offices. While, until recently, this plant was only considered in terms of providing voice grade and low speed data communications, efforts have been made to enhance and extend the life of the network to further support the increased demands of high speed data transport. At the central office level, this can be accomplished by installation of new data switching and routing equipment. However, the existing distribution system is not as easily upgraded. In particular, the telephone network includes extensive webs of buried and aerial copper cables, largely in the form of "twisted pair", i.e., ordinary pairs of copper twisted around each other to reduce crosstalk or electromagnetic induction between pairs of wires. To a lesser, albeit an increasing extent, the service area of a particular wire center and/or central office may be increased and/or the amount of new cabling to be installed may be minimized by the use of a subscriber loop carrier (SLC) system to "virtually" extend central office switching and transmission facilities into the field. While these transmission facilities are designed to support voice grade telephone circuits in the 300 Hz to 2700 KHz range, using advanced digital encoding techniques and equipment has enabled the transmission of digital data over these same lines.

Initial efforts to send digital information included relatively low speed 110 baud teletype signals using modems at both ends of a dial-up telephone connection. As connectivity and bandwidth between and among central offices and centralized information providers was enhanced with new technology, a data bottleneck was realized in the local loop from the telephone central office to the subscriber. One solution to expanding the available loop bandwidth is realized using pure digital services such as ISDN. However, even further bandwidth is obtained using transceivers or modems supporting various digital subscriber line (DSL) technologies including, for example, high-bit-rate DSL (HDSL), asymmetric DSL (ADSL), rate-adaptive DSL (RADSL), very high data rate DSL (VDSL), and others. These services provide both symmetric and asymmetric (and, in the case of unidirectional DSL, one-way) data connectivity on a twisted pair telephone loop at downstream rates of up to 12.9 to even 52.8 Mbps depending on actual and effective loop length, capacitance and loading.

At the telephone central office the DSL signal is recovered from the loop and interfaced to a high speed data network for transmission to a service provider (SP). The voice telephone signal is separately routed to a voice switch such as a Lucent 5ESS or Nortel DMS-100.

At the central office the data signal is either handed off to the SP or corporate LAN. The SP's data network is then used to complete routing of the traffic to a distant server or other form of terminal by providing bidirectional communications interface with other systems and/or networks. If the SP is an ISP providing access to, for example, the world wide web (www), the signal has the potential of being routed through and by way of many further backbone and regional networks before reaching the desired server or client node.

For example, the commonly-assigned patent of Farry et al., U.S. Pat. No. 5,818,511, entitled "Full service networks," issued Oct. 6, 1998, the disclosure of which is incorporated herein in its entirety by reference, discloses a digital switching network which accommodates a full range of broadband and narrowband digital technologies, including video, wideband data, narrowband data, video on demand and television channels in an integrated manner. Optical fiber connects information sources to the switching component of the network utilizing a standardized transport stream such as SONET OC—N. A broadband asynchronous transfer mode (ATM) switch, a digital cross-connect switch or other distribution mechanisms may be utilized to interconnect information sources and subscribers. A level 1 gateway is utilized to control access to all information resources on the network.

Seaholtz et al., U.S. Pat. No. 5,812,786, entitled "Variable rate and variable mode transmission system," also commonly-assigned, issued Sep. 22, 1998, the disclosure of which is incorporated herein in its entirety by reference, discloses a public switched telephone network (PSTN) providing communication of digital data from a data provider or LAN to one or more of a plurality of subscriber premises. Asymmetrical digital subscriber line interface units operating at variable rates and in variable modes (ADSL/AVRs) over a local loop offer one-way video-on-demand and other services and carry the necessary signaling between the subscribers and information providers. In an asymmetric mode, the interface units frequency multiplex digital information with voice information to the subscriber and support transmission of a reverse control channel from the subscriber to the central office for transmission back to the information provider. Other modes are supported which permit selective bi-directional and reversible communications as well.

Because of the potential number of communication links involved, it is often difficult to assess if and where a problem might exist in the system. Further, because the customer may assume that the actual throughput is solely determined by the available and actual throughput of the communications link with the SP, the local exchange carrier (LEC) is often called and required to investigate and attend to actual and/or perceived service problems. These trouble reports may be initiated by a loss of data service, reduced throughput (i.e., data rate limitations), and other connectivity concerns of the customer.

At present, resolution of these trouble reports requires a service representative to take the report and attempt to eliminate and/or correct readily identifiable problems, such as power failures, an unplugged computer, system outages, etc. If this initial attempt to address and correct the trouble is unsuccessful, it is usually necessary to dispatch a service technician to the customer premises or other facilities to identify, locate, and if possible, remedy the trouble. Not only does this process often result in delay, it is costly in terms of human and equipment resources, inconvenient to the subscriber, and often results in an unnecessary dispatch.

Accordingly, a need exists for a system and method for promptly handling and resolving customer trouble reports.

A further need exists to partially automate trouble identification and isolation within a data network.

A still further need exists for a service facility that limits service technician dispatch requirements.

A still further need exists for quality assurance checks to automatically check and verify system performance.

SUMMARY OF THE INVENTION

In accordance with one aspect of the invention, a data transmission system includes a remote computer having a modem and a display. The display provides a visual indication of a downstream data rate received, and an upstream data rate transmitted by and through the modem. A transmission facility connects the modem to a central communications facility having a corresponding modem so as to provide data communications between the central facility and the remote computer system. The central facility includes a packet switch connected to the modem so as to provide bidirectional digital communications with the remote computer via its modem. A test server is also connected to the packet switch and configured to transmit and receive respective predetermined downstream and upstream messages to and from the remote computer. As a result, the actual numeric value of the calculated throughput rate is displayed to the user. At the same time, the results of the throughput test are transmitted to and stored on the throughput server.

According to a feature of the invention, the data transmission system also includes a bi-directional interface with a remote data network connected to the packet switch. The data transmission system selectively provides communications between the remote computer and either the test server or the remote data network. Thus, the remote data network alternatively provides connectivity to the remote compute via the central facility in support of, for example, Internet connectivity and other forms of remote access.

According to another feature of the invention, the remote computer is programmed to calculate downstream and upstream data rates independently of each other.

According to another feature of the invention, the test server is configured to download executable code (e.g., JAVA applets) to the remote computer, thereby providing the necessary software in support of the visual indication of the downstream and upstream data rates. The remote computer, accordingly, may include a browser to provide a user interface with the remote network wherein the executable code comprises an applet executed by the browser.

According to another feature of the invention, the modems may be DSL transceivers, the modem at the computer comprising an ADSL terminal unit-remote (ATU-R).

According to other features of the invention, the transmission facility may include twisted-pair, subscriber line interface circuits (SLIC) or a digital loop carrier line interface circuit (DLC-SLIC). The central facility may include a telephone network central office, wire center, and/or a remote telecommunication equipment center, the latter extending the capabilities and facilities of a central office into the field.

According to another aspect of the invention, a data transmission network includes a plurality of remote computers, each having a modem and a display capable of providing a visual indication of downstream and upstream data rates received and transmitted by the data modem. A transmission facility connects the modems to a central office facility having a plurality of local modems communicating with corresponding ones of the remote computer modems. A packet switch at the central office facility is connected to the local modems to provide bi-directional digital data communication through the packet switch and the transmission facilities between the computers and at least one remote data network. A test server is connected to the packet switch so as to transmit and receive downstream and upstream test messages to a selected computer. In response to these test messages, the remote computers are configured to provide a visual indication of the respective upstream and downstream data rates.

According to another aspect of the invention, a method of measuring a performance of a data transmission facility includes the steps of connecting a remote data terminal device to a central communications facility via the data transmission facility and rerouting, at the central communications facility, a data communication connectivity of the remote data terminal device with a remote data network so as to instead establish connectivity between the remote data terminal device and a test server. A test program is downloaded from the test server to the remote data terminal and an upstream test signal is transmitted from the remote data terminal to the test server. Conversely, a downstream test signal is transmitted from the test server to the data terminal so that the remote data terminal displays a performance of the data transmission facility in transmitting the upstream and downstream test signals.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict the present invention by way of example, not by way of limitations. In the figures, like referenced numerals refer to the same or similar elements.

BEST MODE FOR CARRYING OUT THE INVENTION

Figure 1:
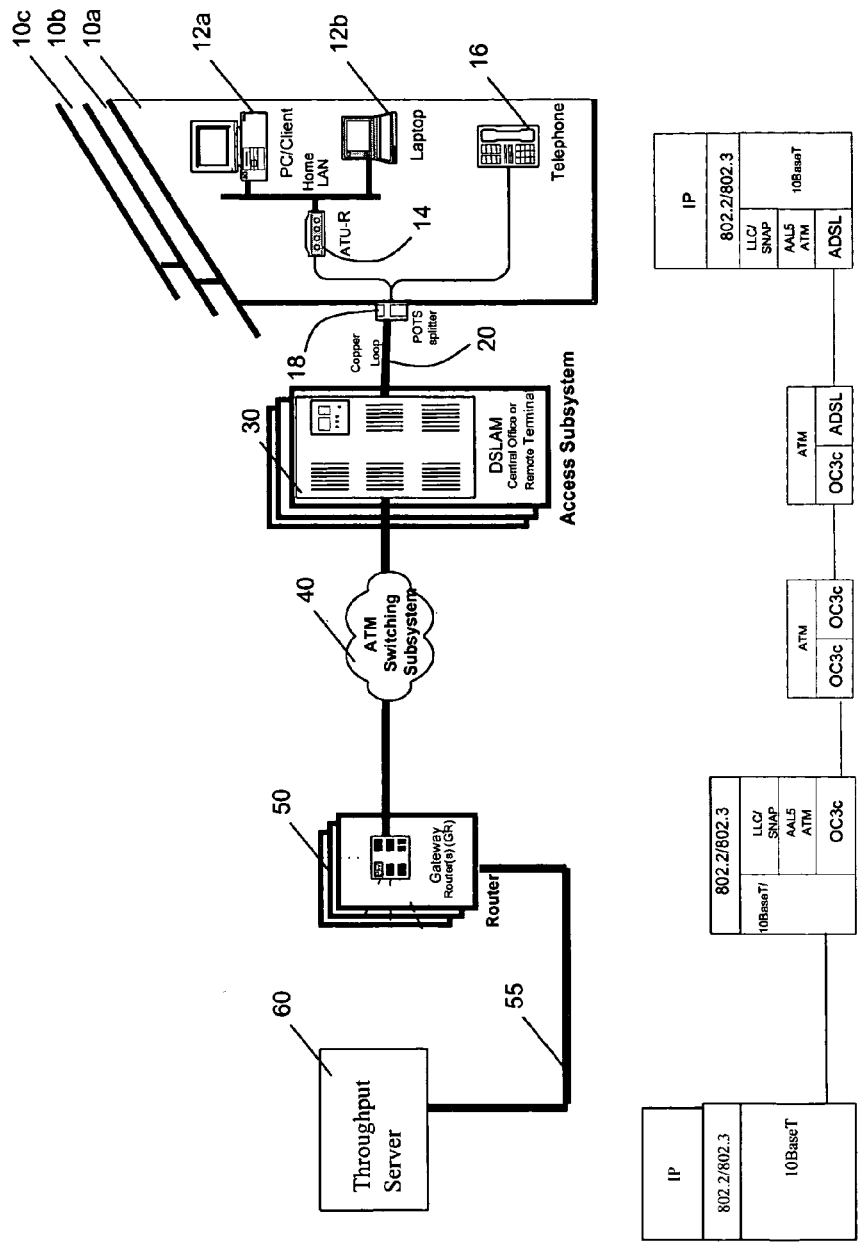
FIG. 1 is a block diagram of a throughput test server (TTS) configuration over a high speed data network.

The throughput test server (TTS) according to the present invention includes software and related hardware for the measurement of upstream (from a remote customer PC) and downstream (to the remote customer PC) throughput rates on digital subscriber lines (DSLs) including ADSL and similar lines. TTS systems and results may be employed and used by local exchange carriers (LECs) to facilitate identification and resolution of problems in the ADSL and other types of DSLs. Because the LEC only provides connectivity from the customer premises to a local or regional interface such as a point-of-presence (POP) maintained by a service provider (SP) (such as an Internet service provider (ISP)), it is often difficult to determine which portion of a communications connection may be malfunctioning. The TTS speeds fault isolation and confirms operation of the network segment provided by the LEC without requiring dispatch of a service technician.

The TTS is used when data services subscriber reports an apparent speed problem with an ADSL line to the LEC, and the problem cannot be easily identified or solved. In this case, a technician connects the customer to the TTS server, which temporarily substitutes for the customer's regular SP. The customer, using a web browser, downloads from the TTS (which acts as a web server) a throughput test web page and executable applet to the PC. By running the applet, the customer performs measurements of upstream and downstream throughput rates of the ADSL connection. The applet presents results to the customer, and automatically sends results to the LEC for further analysis (test results are written to a log file on the TTS. After the test, the applet is automatically deleted from the customer PC when the Web Browser is closed.

In systems providing multiple classes of ADSL service, the TTS may be deployed with multiple sets of input parameters, each optimized for testing of a particular speed of ADSL service. The throughput test server can support measurements of any rates upstream or downstream. The throughput test server is adapted for use with presently deployed ADSL systems operating at, for example, 640 K BPS, 1.6 MBPS, or 7.1 MBPS, although it is adaptable to other operating speeds as they become available and are deployed. Each input parameter set is embedded in the web page that initiates the applet.

The TTS includes a user interface providing for simplified use and installation without installation or provision of specialized hardware at the customer site. Instead, the system only requires that the customer has installed on the PC a recent version of a Java-enabled web browser, and that the PC has sufficient resources (disk space, RAM) to run the applet. In a few cases, the customer may be required to change some internal settings of the browser. These changes will not usually affect the customer's PC and, if desired, can be reversed after completion of testing. The tests may be repeated multiple times as necessary or desired. Test results are stored on the TTS server for reference and analysis by LEC personnel including service representatives and technicians.

The TTS platform and supporting software include four primary components:

| Component | Function | Description |
|---|---|---|
| Throughput Server | Generates the downstream packet streams, and echo reflections of upstream packet streams | TTS is a JAVA program residing on the throughput server that controls sending and receiving of datagrams. This is the main software component for throughput tests on the service provider side of ADSL communications. |
| Client Applet | Provides the GUI interface to the throughput software and allows the client to run the throughput test from the customer premises. The applet generates upstream packet streams and initiates (triggers) downstream packet streams. | The client applet is stored in the document directory of the web server installed on TTS. It is downloaded to the client's PC when the client accesses the TTS. Using the applet, the client initiates throughput tests. The applet is interpreted by the customer's Java-enabled web browser. Applet input parameters are embedded in the initiating web page. |
| Web Server | Manages HTML test web page with an applet | Web server is standard, commercially available software that presents the throughput test web page (and associated applet) to an external network. The web server is set to allow access by customers identified by the LEC. |
| JAVA Runtime Environment | Provides the JAVA interpreter on TTS. | JAVA engine must be capable of running in "native" mode. |

FIG. 1 presents a block architecture and corresponding protocol stack used with the TTS in a high speed data network. The TTS provides throughput testing for a large public network of subscribers at multiple customer locations 10a, 10b, 10c, etc. Each of these locations may include various data communications terminals, typically in the form of personal and laptop computers 12a and 12b. These resources may function as clients in a server-client relationship to be described. In a small office/home office environment or similar configuration having multiple computers, the clients may be networked over a local area network and provided with communications connectivity via ADSL terminal unit-remote (ATU-R) 14. Also shown at customer location 10a is a telephone system 16. A POTS splitter 18 is connected to copper loop 20, typically consisting of a twisted pair, for providing data signal connectivity to ATU-R 14 and POTS signaling to telephone system 16.

Access subsystem 30, including a digital subscriber line access multiplexer (DSLAM), is provided at a central office (CO) or at a remote terminal (RT) location for providing data signaling connectivity with ATU-R 14. A CO splitter (not shown) may be provided at the point where transmission facility 20 interfaces with DSLAM 30 to split off the POTS signal and provide the same to a conventional central office voice switch.

DSLAM 30 is interfaced with ATM switching subsystem 40 providing multiplexed data signals which are then supplied to gateway routers 50. Typically, gateway routers 50 provide the required interface with a service provider (SP), typically an ISP (Internet service provider). According to the invention, as an alternative to providing connectivity to the ISP, data signal connectivity is instead provided to TTS 60 to enable testing of copper loop 20 and related facilities. TTS 60 is a server type computer system hosting the test web page, an example being, but not limited to, a Dell 2300 running a LINUX operating system. The test web page includes HTML with embedded JAVA applets for download to the customer's PC operating as a client. The JAVA applets initiate test message transmissions to and from the server. The applet uses the time required to transmit and receive the test message to compute and display both upstream and downstream data throughput rates.

The bottom of FIG. 1 includes the protocol stack appropriate to each of the systems shown immediately thereabove. Thus, TTS 60 and router 50 are connected by an Ethernet 10BaseT connection 55 for, ultimately, providing IP communication to the respective applications residing on those systems. Similarly, router 50 includes the appropriate interface systems to communicate the IP messaging through to an OC3C format for communication via ATM switching system 40 through to DSLAM 30. DSLAM 30 includes protocol conversion for encapsulating the IP messages contained within the ATM protocol to an ADSL format for transmission to and from ATU-R 14.

Figure 2:
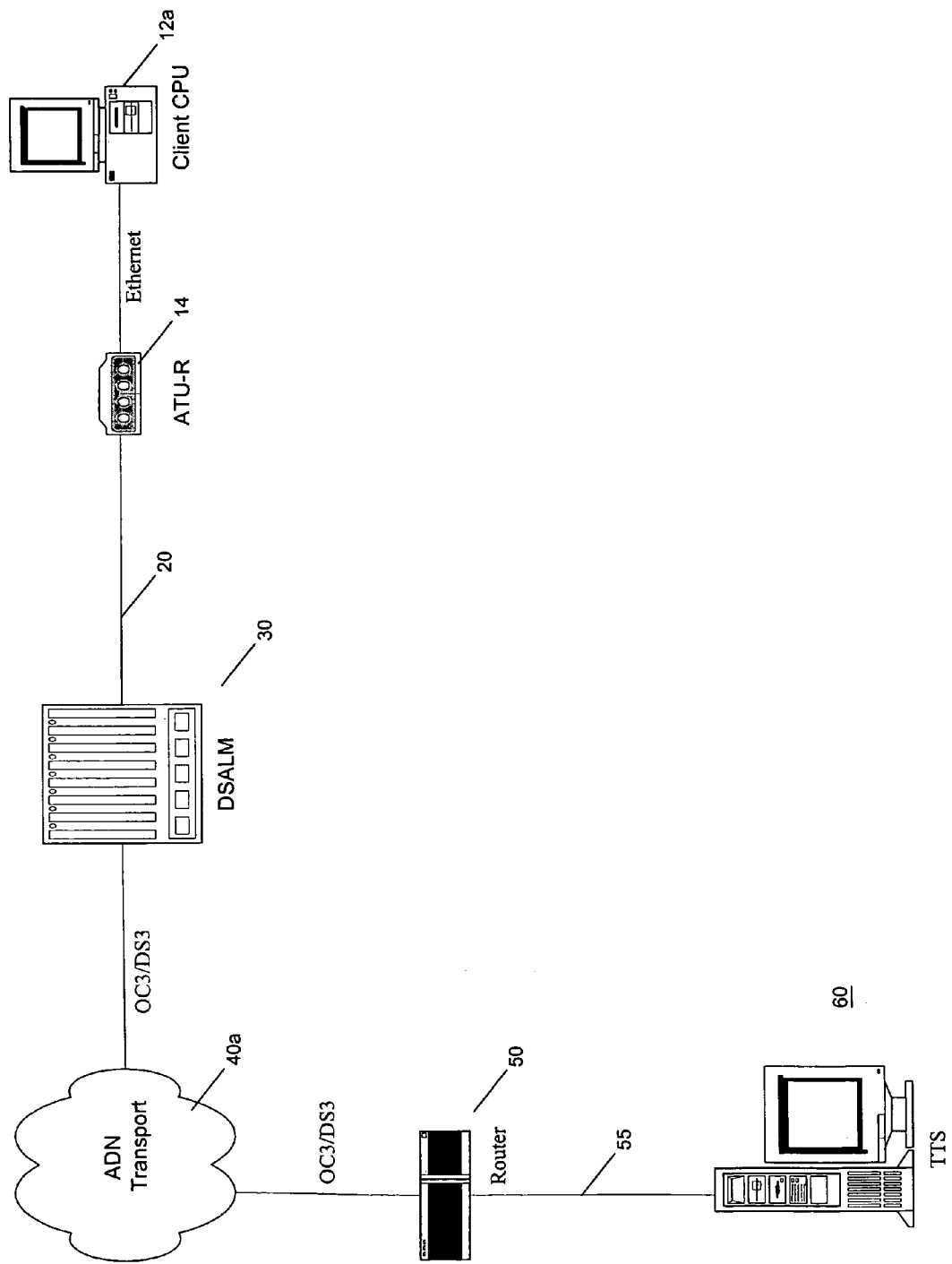
FIG. 2 is a block diagram of physical connectivity of a TTS.

A block diagram of the TTS physical connectivity is shown in FIG. 2 of the drawings. Therein, client PC 12a is connected via an Ethernet connection to ATU-R 14 which, in turn, is connected via twisted copper pair local loop 20 to DSLAM 30 using ADSL signaling and protocol. DSLAM 30 receives and demultiplexes the ADSL signal into an ATM format and converts upstream and downstream signaling to/from OC3/DS3. The OC3/DS3 signal is carried via ADSL Data Network (ADN) 40a to provide connectivity with a gateway router 50. The gateway router may be, for example, a CISCO Catalyst 5500 or a Redback SMS 1000. The gateway router supports high-performance multi-layer switching including ATM and wide area network (WAN) connectivity. The gateway router includes Ethernet 100BaseT connectivity 55 to TTS 60.

Figure 3:
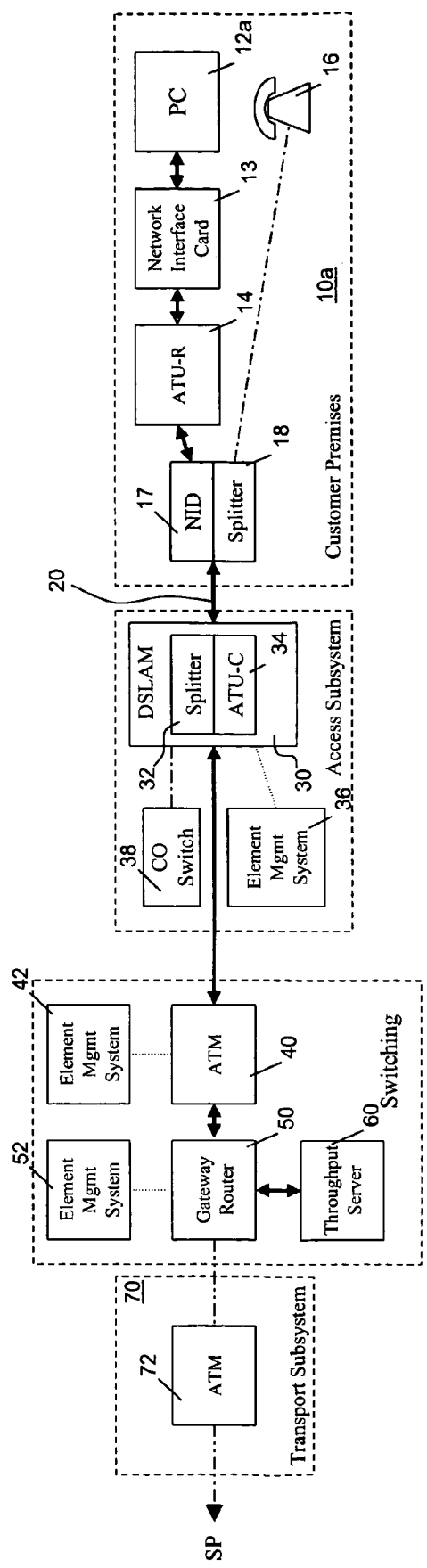
FIG. 3 is a block diagram of major subsystems of an ADSL data network (ADN) including a TTS.

TTS 60 is integrated into a network comprising four major subsystems as shown in FIG. 3. At the customer premises 10a, data communication with PC 12a is provided through a network interface card (NIC) 13 which interfaces an internal data bus of PC 12a to ATU-R 14. ATU-R 14 is, in turn, connected through network interface device (NID) 17 which provides connectivity to transmission facilities 20 and the access subsystem. Also associated with NID 17 is splitter 18 which provides POTS signaling to telephone system 16 from transmission facility 20. There are other implementations of ADSL such as microfilters (splitters) and G.Lite which can also use the TTS.

The access subsystem includes DSLAM 30 which, in turn, may include a splitter 32 to separate POTS signaling from digital packet data multiplexed on transmission facility 20. The digital packet data is provided to ATU-C 34 which, in turn, is connected to ATM 40 of the switching subsystem. On the other hand, POTS signal are provided to CO switch 38 for conventional telephone voice signaling and switching. The access subsystem also includes an element management system 36 for coordinating and controlling DSLAM 30. The switching subsystem includes ATM 40 which receives digital packets from DSLAM 30 and routes the traffic to gateway router 50, also part of the switching subsystem. Both gateway router 50 and ATM 40 have associated element management systems 52 and 42, respectively. Gateway router 50 selectively connects virtual circuits from ATM switch 40 to data networks using a router to TTS 60. The transport subsystem 70 includes ATM switch 72 for interfacing with service providers.

Upon receiving a trouble report, a technician would attempt to isolate network problems as follows.

1. A technician would dynamically or statically reconfigure the gateway router 50 necessary to switch the customer's data circuit from his SP.
2. The customer requests a test web page from the TTS using a designated URL.
3. The test web page with applet is downloaded to the customer's PC.
4. The applet starts running. After filling in the user ID and telephone number, the client starts the throughput test.
5. A predetermined set of packets, above the bottleneck speed of the upstream link, are sent from PC 12a upstream to the TTS 60. On the TTS, interarrival time of packets is used to calculate the upstream link speed.
6. A trigger packet is sent by the applet (on PC 12a) upstream to the TTS. The trigger initiates a downstream transmission of packets to PC 12a at a rate above the bottleneck rate of the downstream link. The applet uses interarrival time of packets to calculate downstream link speed.

As indicated, the TTS uses measurement of the interarrival time of packets flooding the channel near or above the bottle neck capacity to independently determine both uplink and downlink link throughput.

Operationally, to perform the throughput test of the ADSL connection, the customer would first contact customer service. If customer service cannot resolve the problem, it will issue a trouble ticket to the appropriate technical support organization. A technician would then contact the customer and initiate the test procedure. The customer is then given an URL address of the TTS web site with which he/she can access the throughput server and perform the test.

Figure 4:
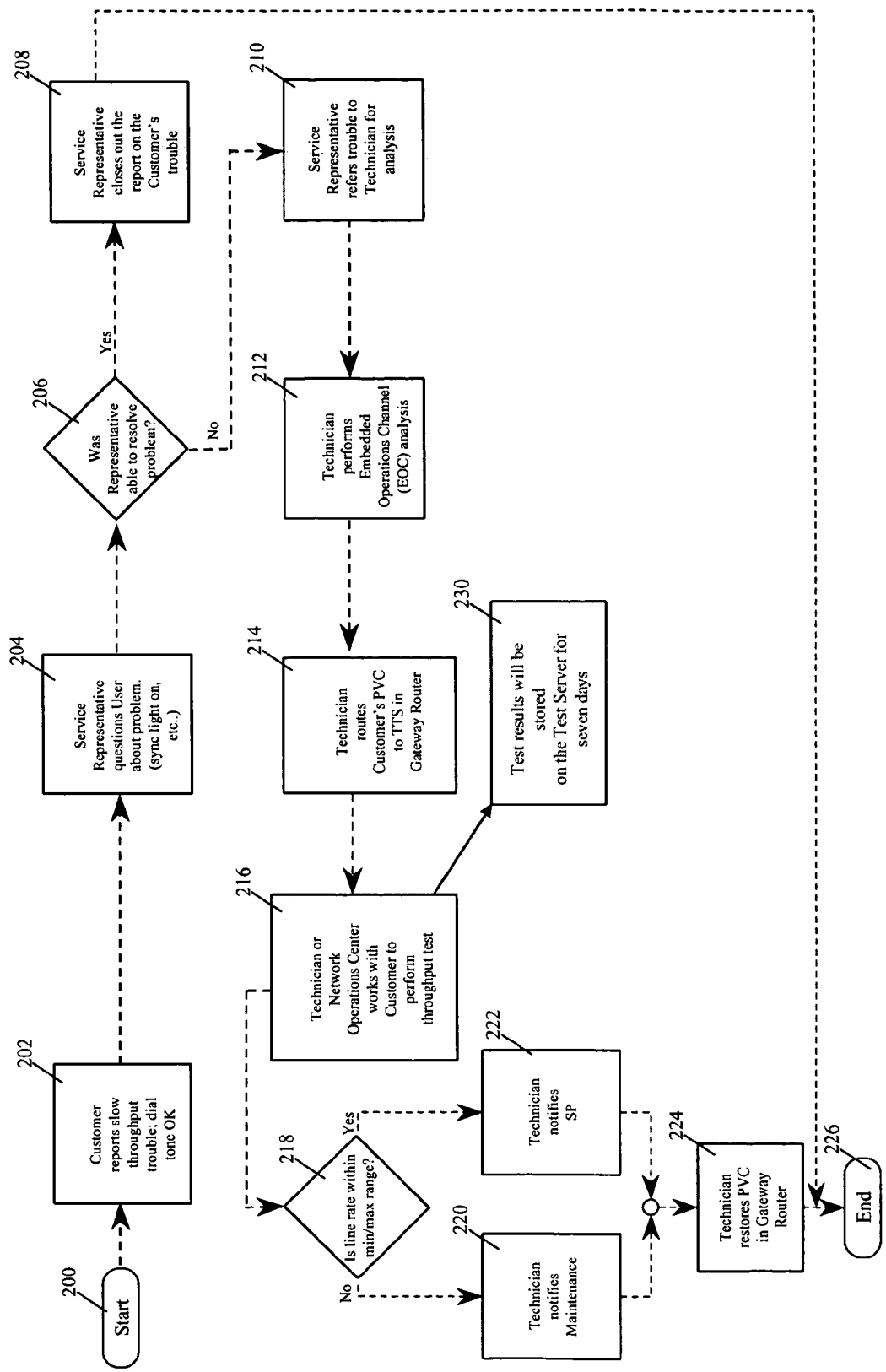
FIG. 4 is a flow diagram of a method of testing an ADN using a TTS capability.

A detailed process for handling a customer complaint is flowcharted in FIG. 4. After initiating the process at block 200, a customer trouble report is received at block 202 and directed to a service representative at 204 for initial handling. The service representative uses a script or otherwise elicits information from the customer to identify and isolate commonly occurring faults and obtain information helpful in handling and directing the call to the appropriate personnel. Thus, the service representative may attempt to determine if power is being supplied to required equipment, whether carrier and data indicator lights are consistent with a particular initial diagnosis, etc. If the service representative is able to resolve the problem at decision block 206, then the trouble report is closed out at step 208. Otherwise, processing continues at step 210 where the service representative refers the trouble to a technician for analysis and further testing.

At step 212, the technician performs an embedded operations channel (EOC) analysis to determine if data is being received and transmitted between the central office facilities and the customer. Processing then continues at step 214 where the technician reroutes the customer's virtual connection established in the gateway router to the TTS. At step 216, the technician either directly or through the network's operations center, as appropriate, works with the customer to perform a throughput test to determine if the supplied link between the customer and the central telephone facilities is operating within predetermined operational limits. The test results are determined at step 218, displayed to the customer and stored on the TTS for later reference at step 230. If the test is failed, then the technician notifies maintenance at step 220 to initiate further testing and possible dispatch of personnel to the customer premises to identify and correct problems in or associated with the local loop. Alternatively, if the local loop and associated ADSL equipment are functioning properly according to the TTS generated results, then the technician notifies the service provider at step 222 so that the portion of their network used to service the customer can be checked for proper performance and faults. Upon completion of all testing, the technician restores the connection in the gateway router to reestablish connectivity between the customer and the SP at step 224, the process terminating at step 226.

Three steps are involved in the performance of the test, as follows:
   Step 1: Customer accesses the TTS through browser.
   Step 2: Customer logs in to the TTS and initiates the throughput test.
   Step 3: Customer views throughput test results.

In the first step, the customer accesses the TTS web site entry page and chooses an appropriate test as directed by the service representative. To access the throughput server the customer must first activate the Internet browser on his PC. Once the browser window is displayed the customer must access the throughput server by entering the URL address of the throughput server in the "LOCATION" box in the top of the browser form. The proper URL address to enter will be given to the customer by the service representative. The customer must type this address into the browser as shown in FIG. 5a.

Figure 5C:
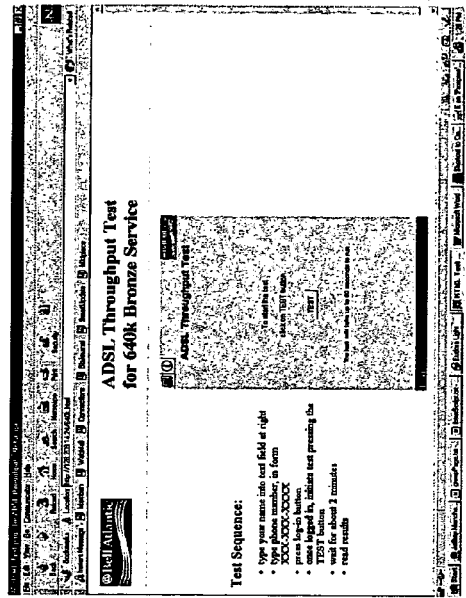
FIGS. 5a–5e are computer browser screen presentations provided to a customer accessing the TTS.
Figure 5D:
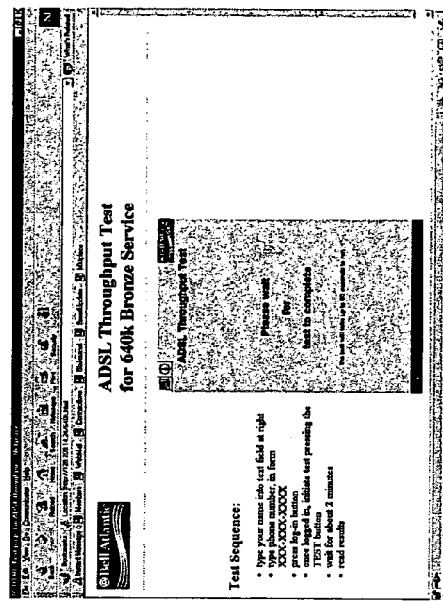
Figure 5A:
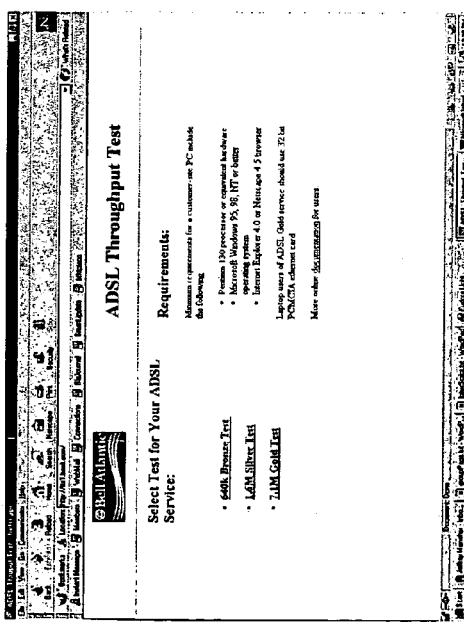
Figure 5B:
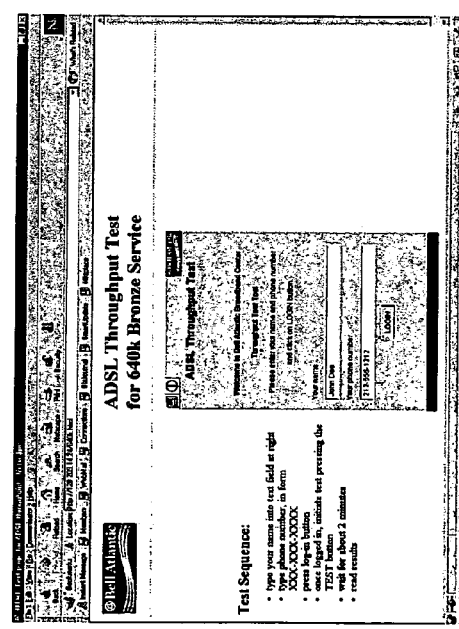
Figure 5E:
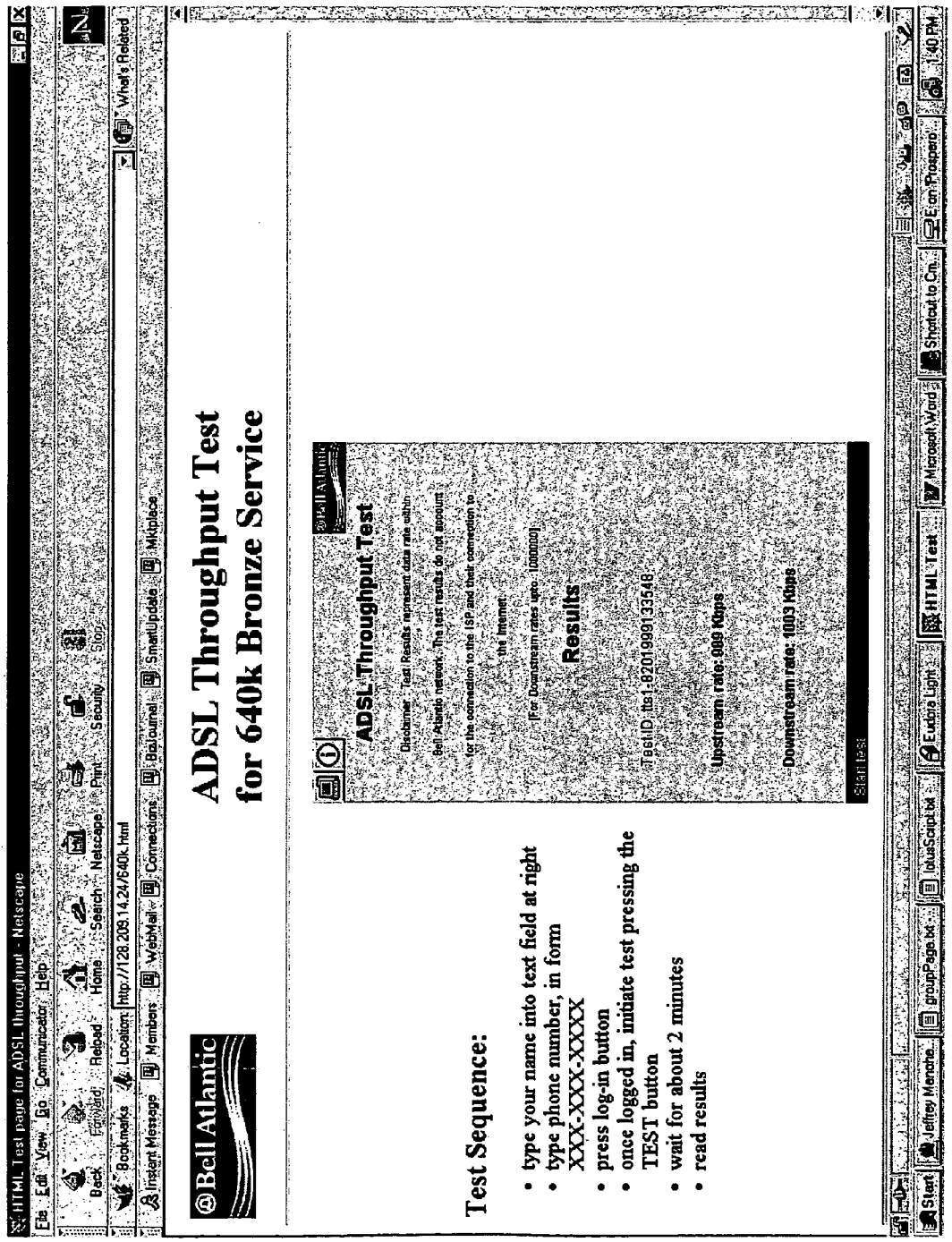

When the throughput server web site is accessed, the customer will initially see a display similar to the one shown in FIG. 5a. The customer must enter his name and telephone number, as shown in FIG. 5b. This information will be included in the test results log when the test results are reported back. To initiate the throughput test the customer pushes the start button as shown in FIG. 5c. While the throughput test is running, the customer waits for about thirty seconds. During this time, the screen appears as shown in FIG. 5d. Upon completion of the throughput test, results are presented to the customer and are uploaded to TTS 60 from the PC 12a. Presentation of test results on the customer's PC is shown in FIG. 5e.

The results of the test will show the ADSL line speed below the speed at which the line is provisioned as the throughput measurement tool reports the data rate not a line rate. However, the reported data rate should be within the operational limits defined for a particular level of service. If the measured rate is outside of these limits, the customer should report it.

Figure 6:
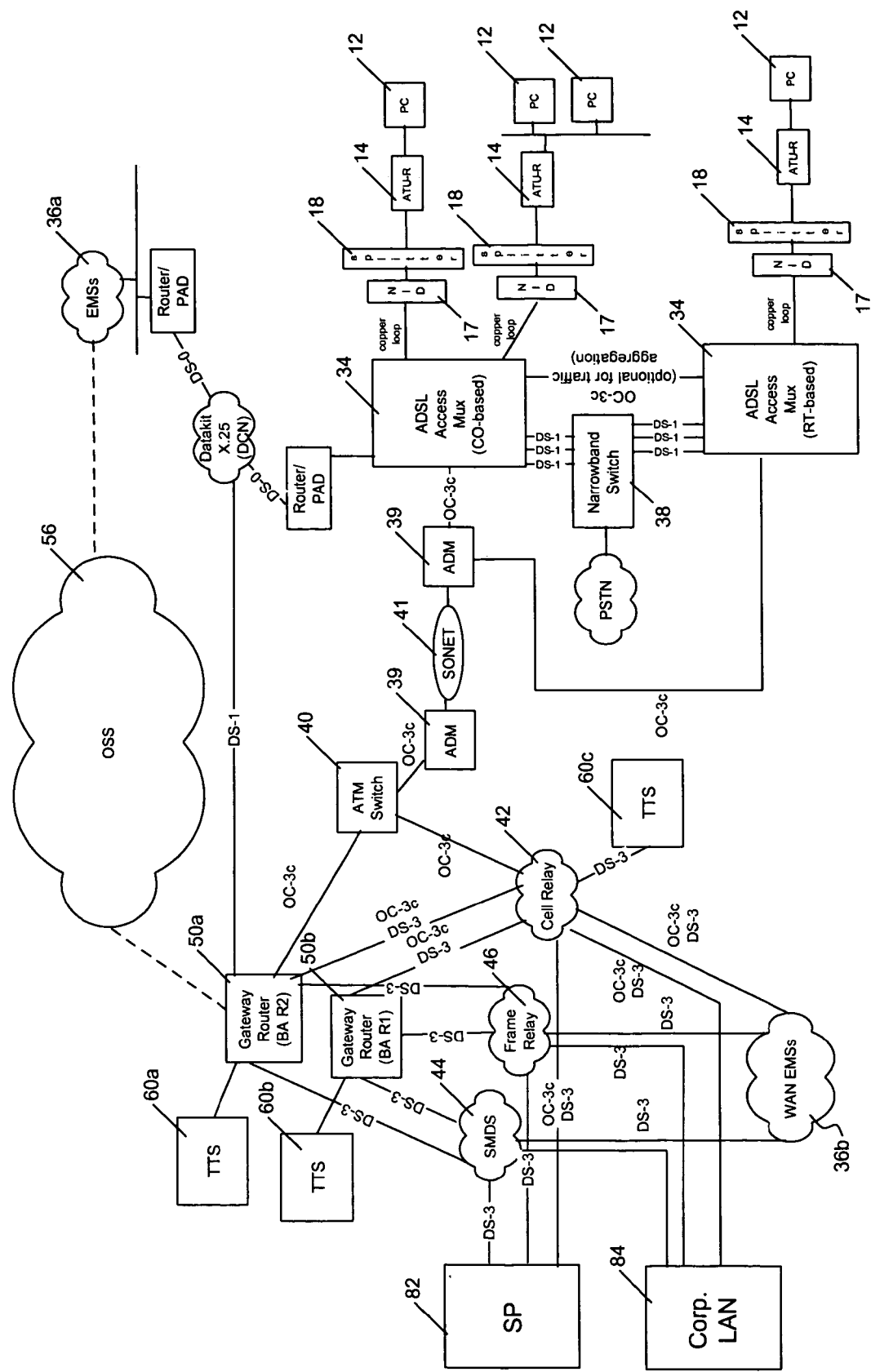
FIG. 6 is a block diagram of an ADN physical architecture with centralized gateway router.

An ADN is shown in further detail in FIG. 6, including TTS diagnostic capabilities using a high speed data architecture. The central office selectively provides connectivity between subscribers via ATM switch 40 and either their designated SP or the (i) TTS platforms 60a and 60b connected to respective gateway routers 50a and 50b, or (ii) TTS 60c via a DS3 connection to cell relay network 42 and ATM switch 40. Ethernet frames generated by the subscriber's PC are carried across the ADN via ATM virtual connections (VCs). The Ethernet frames are then bridged to a fast packet network 80 that supports SPs 82, and corporate LANs 84. Therefore, the ADN effectively provides high speed data transport service between subscribers and SPs 82 and corporate LANs 84.

As shown, multiple client PCs 12 are individually connected or networked to respective ATU-Rs 14. ATU-Rs 14 at the respective customer premises are interfaced to network copper loop facilities via splitters 18 and NIDs 17 to provide connectivity with one or more telco ADSL access multiplexers 34. From there, telephony signals are separated and routed to one or more narrowband switches 38 for transmission over the PSTN. Digital data packets are instead routed via an OC3 connection to ADM 39 for transmission over SONET network 41 (and far end ADM 39) to ATM switch 40. Connectivity is extended through ATM switch 40 to SMDS 44 and frame relay network 46 via respective gateway routers 50a and 50b to provide data communications with other networks and nodes including SP 82 and corporate LAN 84.

Gateway routers 50a and 50b are also connected to respective TTSs 60a and 60b to provide selective access by PCs 12 to data service testing and verification routines available on and supported by the TTSs. A TTS 60c may also be provided with a direct DS3 connection to cell relay network 42 without first going through a gateway router. This configuration is particularly applicable to architectures wherein the remote server at SP 82 or corporate LAN 84 is similarly directly connected to cell relay network 42 thereby obviating the need for a cell relay to SMDS or cell relay to frame relay gateway router 50. Data network supervision and control is performed by OSS 56 and EMSs 36a and 36b.

Figure 7:
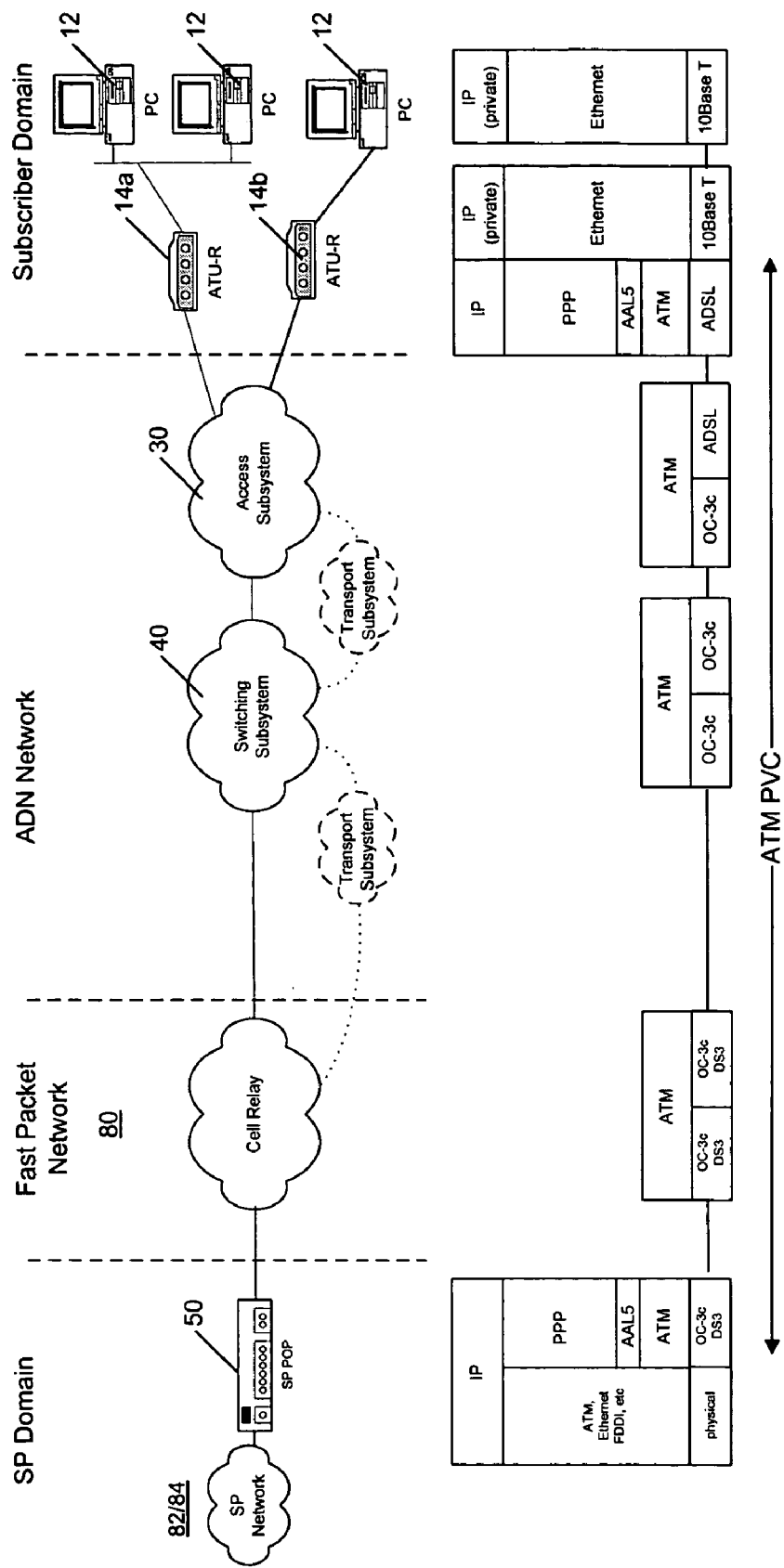
FIG. 7 is a block diagram of a point-to-point (PPP) termination over ATM user plane protocol architecture.

The protocol architecture in FIG. 7 depicts the direct ADN ATM VCs architecture. Depending on the service options selected by the subscriber, VCs are provisioned between ATU-R 14a/14b and one or more SPs 82 or corporate LANs 84. A single PPP session can be transported over each ATM VC. All PPP related processing, including link configuration, authentication, and network layer configuration, is conducted between the TTS or SP's access server and the device originating the PPP session at the customer's premises, which in this case is the ATU-R 14. Once the PPP session is established, packets from/to the subscriber are PPP encapsulated and carried to/from the SP.

Figure 8:
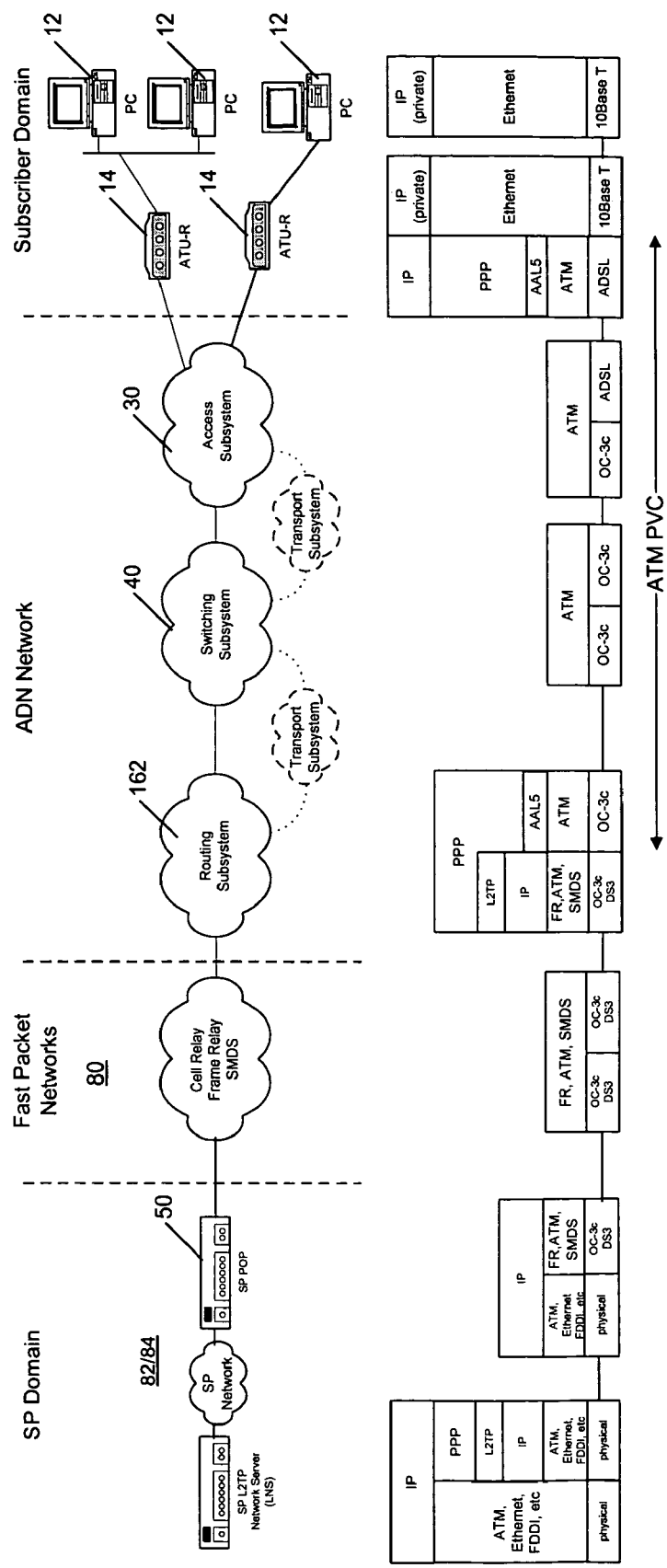
FIG. 8 is a block diagram of a PPP tunneling user plane protocol architecture.

Another type of connection would be to use PPP as shown in FIG. 8. A PPP session could then be initiated through the subscriber domain such as help@saserver.bellatlantic.com. The structured username would be examined by the routing subsystem which is configured to tunnel sessions with the appropriate appendix (e.g., @saserver.bellatlantic.com) to the TTS. Depending on whether the PPP session can be established or where it fails, a service technician would be able to identify the subscriber's problem.

Figure 9:
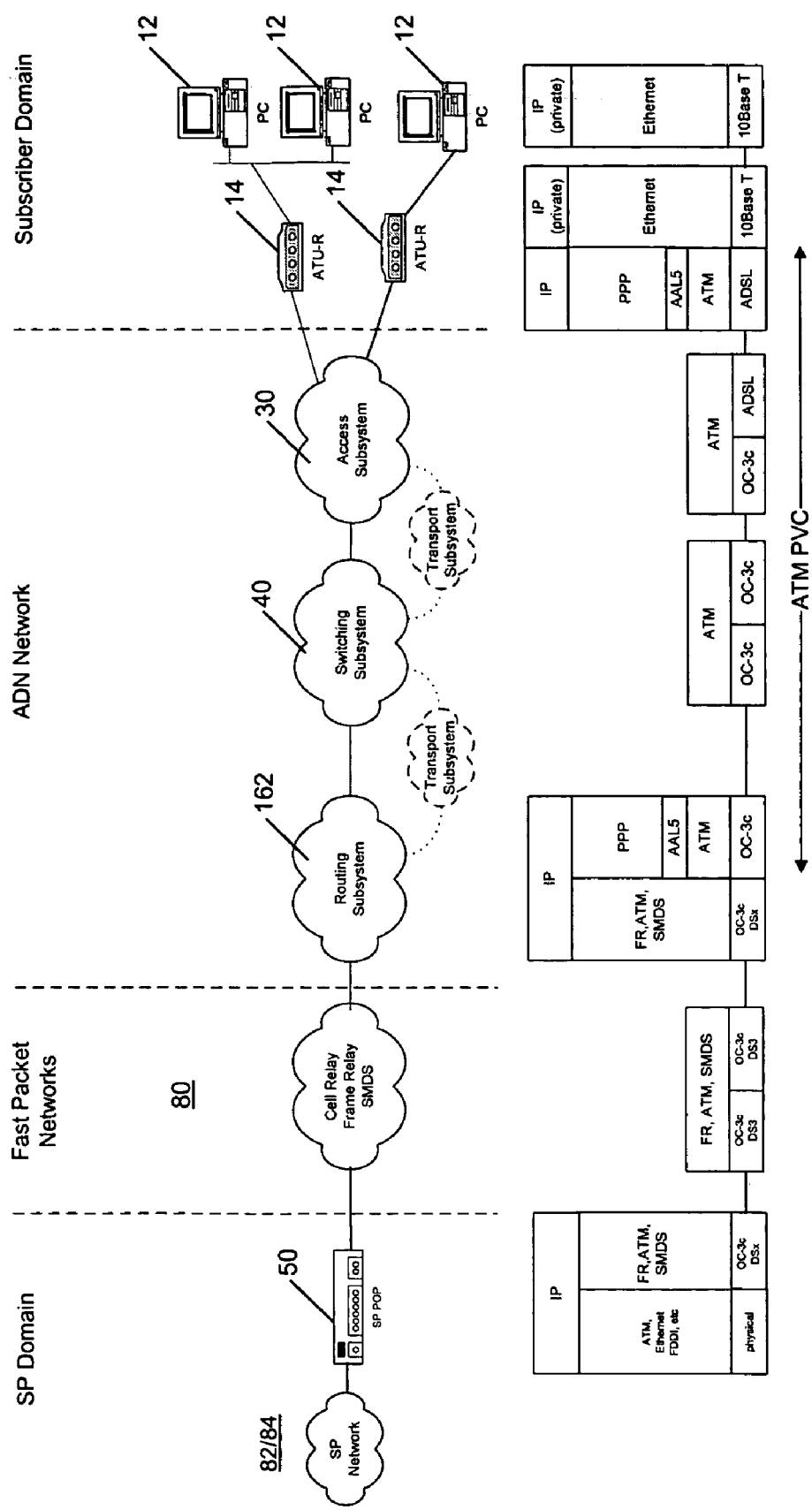
FIG. 9 is a block diagram of a PPP termination user plane protocol architecture.

Referring to FIG. 9, in another configuration, a PPP session is initiated from ATU-R 14 and carried over an ATM PVC to the routing subsystem 162. The PPP link layer is first established between the routing subsystem and the ATU-R 14 via PPP's Link Control Protocol. If the link is successfully established, the ATU-R 14 passes the user name and password to the routing subsystem. The routing subsystem uses the structured username (e.g., jean@bellatlantic.net) to determine the desired SP endpoint.

Once the ATU-R 14 has been configured with an URL address, subscriber data may be sent over the PPP session. Packets received from the subscriber's PC undergo network address translation at the ATU-R 14 before being encapsulated into PPP frames and sent into the ADN. Similarly packets received from the TTS and/or SPs are first recovered from their PPP frames at the ATU-R 14. The ATU-R 14 then performs network address translation before sending the packets back to the subscriber's PC. In this protocol architecture, the routing subsystem terminates the PPP protocol, recovers the subscriber's packets, and routes the packets to the TTS subscriber's SP 82 or corporate LAN 84.

The TTS again provides a mechanism to test PPP connectivity to the subscriber via the ADN platform. The gateway router is configured to tunnel or terminate and route traffic to the service assurance server upon receipt of the appropriate structured user name during PPP authentication. This server can also support throughput testing if subscribers are complaining about performance.

Figure 10:
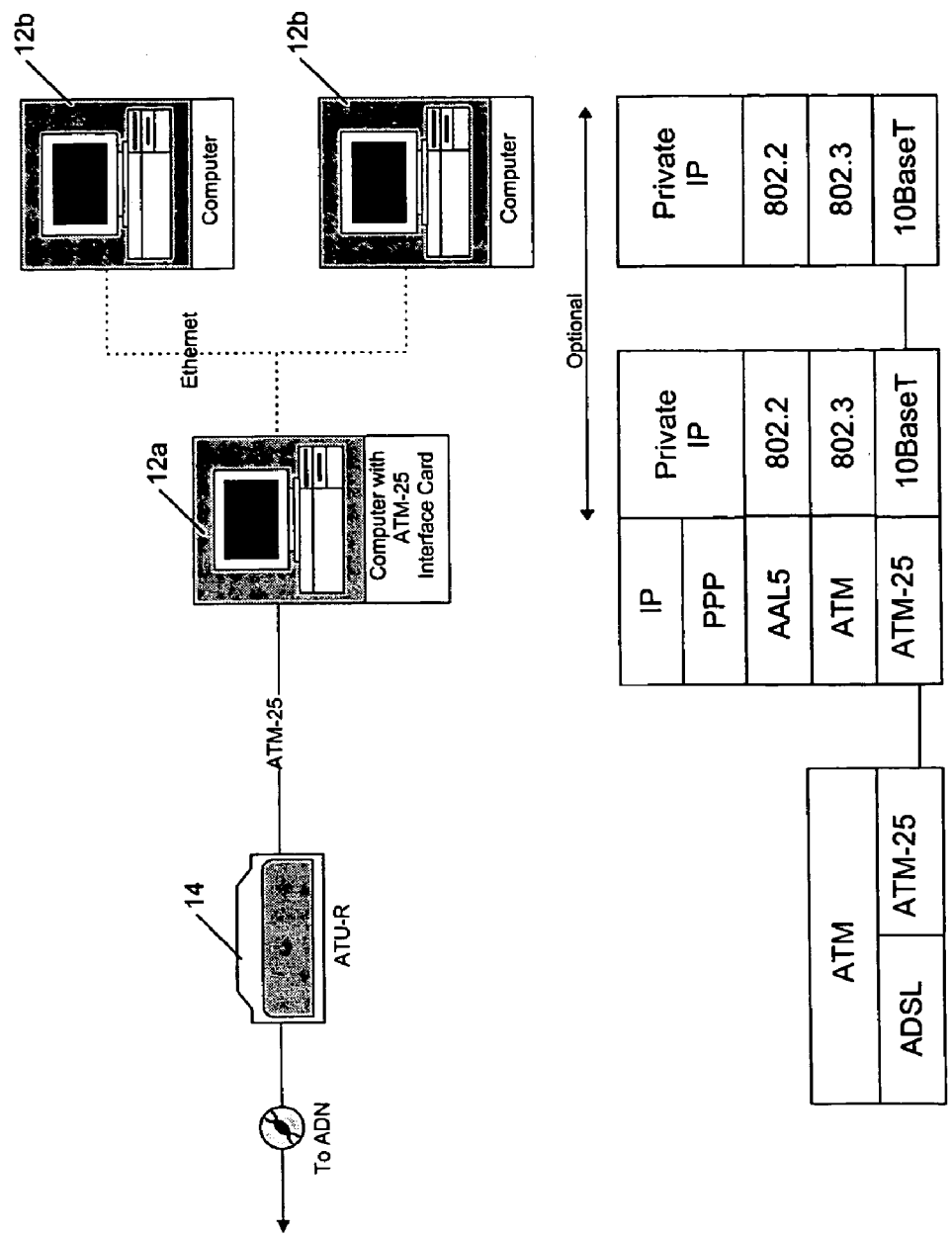
FIG. 10 is a block diagram of a protocol architecture used to interconnect a subscriber's PC to an ATU-R via an ATM25 NIC card.

An alternative PC to ATU-R Interface is shown in FIG. 10 wherein the ATU-R 14 interfaces with the computer 12a via an ATM25 network interface card (NIC). In this configuration, ATU-R 14 functions as an ATM25-to-ADSL media converter. The PPP session is originated on the PC 12a configured with the ATM-25 card. This PC 12a may optionally support a backside Ethernet LAN where it proxies PPP sessions for the other PCs 12b. Network address translation is performed by the ATM capable PC 12a if supporting a backside LAN.

The subscriber interface is determined by the specific SP to which the subscriber has established service. Typically the SP will provide the subscriber with a web browser and ensure the appropriate protocols (e.g., TCP/IP, HTTP) required to support the web browser are present and configured properly.

Although the present invention has been described in terms of an ADSL environment, it is equally applicable to other forms and types of access to customer premises data transmission systems including, but not limited to, DSL in general, optical, RF, and similar systems in which confirmation of data throughput rates and detection and identification of system degradation and failure is required. The invention is equally applicable to both symmetric and asymmetric transmission systems. Further, this system and corresponding method may, of course, be carried out in specific ways other than those set forth here without departing from the spirit and essential characteristics of the invention. Therefore, the presented embodiments should be considered in all respects as illustrative and not restrictive and all modifications falling within the meaning and equivalency range of the appended claims are intended to be embraced therein.

What is claimed is:

1. A data transmission system comprising:
   (i) a remote computer including
   (a) a far end modem,
   (b) a display providing a visual indication of a downstream data rate received and an upstream data rate transmitted by said data modem, and
   (c) a browser providing a user interface with a remote network; and
   (ii) a transmission facility connecting said modem to a central facility;
   said central facility including:
   (a) a local modem,
   (b) a packet switch connected to said local modem so as to provide therethrough bidirectional digital communications with said remote computer, and
   (c) a test server connected to said packet switch and configured to transmit and receive respective predetermined downstream and upstream messages to and from said remote computer, said test server including multiple sets of input parameters each set optimized for testing a particular speed of data communication service, said test server further configured to download executable code corresponding to a selected one of said sets of input parameters, said executable code including an applet to said remote computer, said applet executed by said remote computer for providing said visual indication of said downstream and upstream data rates wherein said visual indication of said downstream and upstream data rates is calculated based on transmissions of said predetermined downstream and upstream messages, said remote computer transmitting an indication of said downstream and upstream data rates to said test server for storage thereon.

2. The data transmission system according to claim 1 further including a bidirectional interface with a remote data network connected to said packet switch, said data transmission system selectively providing communication between said remote computer and (i) said test server and (ii) said remote data network.

3. The system according to claim 1 wherein said test server is further configured to receive packets from said remote computer and, in response, calculate a data rate.

4. The system according to claim 1 wherein said remote computer is programmed to calculate said downstream and upstream data rates independently of each other.

5. The system according to claim 1 wherein said far end modem comprises an asymmetric digital subscriber line (ADSL) terminal unit—remote (ATU-R).

6. The system according to claim 1 wherein said transmission facility comprises twisted-pair.

7. The system according to claim 1 wherein said transmission facility comprises a subscriber line interface circuit (SLIC).

8. The system according to claim 1 wherein said transmission facility comprises a digital loop carrier subscriber line interface circuit (DLC-SLIC).

9. The system according to claim 1 wherein said central facility comprises a central office.

10. The system according to claim 1 wherein said central facility comprises a remote telecommunication equipment center.

11. The system according to claim 1 wherein said local modem comprises a digital subscriber line access multiplexer (DSLAM).

12. The system according to claim 11 wherein said DSLAM comprises an ADSL terminal unit—central office (ATU-C).

13. The system according to claim 12 wherein said DSLAM further comprises a splitter configured to receive from said transmission facility a composite signal including said bidirectional digital communications and a telephony signal and separately provide said bidirectional digital communications and said telephony signal.

14. The system according to claim 1 wherein said packet switch comprises an ATM (asynchronous transfer mode) dedicated-connection switch.

15. The system according to claim 1 wherein said packet switch comprises a fast packet switching device.

16. The system according to claim 1 wherein said packet switch comprises one of a (i) frame relay, (ii) SMDS (switched multimegabit data service), (iii) switched Ethernet switch, and (iv) ATM.

17. The system according to claim 1 further comprising a router selectively connecting said packet switch to (i) said test server and (ii) a remote data network.

18. The system according to claim 17 wherein said router provides connectivity with a plurality of high speed data networks.

19. A data transmission network comprising:
   (i) a plurality of remote computers, each including
   (a) a far end modem, and
   (b) a display capable of providing a visual indication of a downstream data rate received and an upstream data rate transmitted by said data modem;
   (ii) a transmission facility connecting each of said modems to (iii) a central office facility;

said central office facility including:
  (a) a plurality of local modems in communication with corresponding ones of said far end modems,
  (b) a packet switch connected to said local modems so as to provide bi-directional digital data communications therethrough between said remote computers and at least one remote data network, and
  (c) a test server connected to said packet switch including multiple sets of input parameters each set optimized for testing a particular speed of data communication service and configured to (i) selectively transmit to selective ones of said remote computers executable code corresponding to selective ones of said sets of input parameters, said executable code including an applet; and to transmit and receive respective predetermined downstream and upstream messages to and from selective ones of said remote computers,
  wherein said visual indication of said downstream and upstream data rates is calculated based on transmissions of said predetermined downstream and upstream messages, at least one of said remote computers being programmed in response to said applet to (1) calculate said downstream and upstream data rates independently of each other, and said test server configured to download executable code to said selective ones of said remote computers for providing said visual indication of said downstream and upstream data rates and (2) transmit an indication of said downstream and upstream data rates to said test server for storage thereon.

20. The data transmission system according to claim 19 further including a bidirectional interface with a remote data network connected to said packet switch, said data transmission system selectively providing communication between said remote computers and (i) said test server and (ii) said remote data network.

21. The data transmission network according to claim 19 wherein said test server is further configured to receive packets from said selective ones of said remote computers said predetermined upstream message received from said selective ones of said remote computers and, in response, calculate respective data rates.

22. The data transmission network according to claim 19 wherein at least one of said remote computers is programmed to calculate said downstream and upstream data rates independently of each other.

23. The data transmission network according to claim 19 wherein at least one of said far end modems comprises an ADSL ATU-R.

24. The data transmission network according to claim 19 wherein said transmission facility comprises twisted-pair.

25. The data transmission network according to claim 19 wherein said transmission facility comprises an SLIC.

26. The data transmission network according to claim 19 wherein said transmission facility comprises a DLC-SLIC.

27. The data transmission network according to claim 19 wherein said central office facility further comprises a voice switch wherein telephone signals and said bi-directional digital data communications are transmitted by said transmission facility and said voice switch is connected to said transmission facility to receive said telephone signals.

28. The data transmission network according to claim 19 wherein said central facility comprises a remote telecommunication equipment center.

29. The data transmission network according to claim 19 wherein said local modem comprises a DSLAM.

30. The data transmission network according to claim 29 wherein said DSLAM comprises an ADSL ATU-C.

31. The data transmission network according to claim 30 wherein said DSLAM further comprises a splitter configured to receive from said transmission facility a composite signal including said bidirectional digital communications and a telephony signal and separately provide said bidirectional digital communications and said telephony signal.

32. The data transmission network according to claim 19 wherein said packet switch comprises an ATM (asynchronous transfer mode) dedicated-connection switch.

33. The data transmission network according to claim 19 wherein said packet switch comprises a fast packet switching device.

34. The data transmission network according to claim 19 wherein said packet switch comprises one of a (i) frame relay, (ii) SMDS, (iii) switched Ethernet switch, and (iv) ATM.

35. The data transmission network according to claim 19 further comprising a router selectively connecting said packet switch to (i) said test server and (ii) a remote data network.

36. The data transmission network according to claim 35 wherein said router provides connectivity with a plurality of high speed data networks.

37. A method of measuring a performance of a data transmission facility comprising the steps of:
  connecting a remote data terminal device to a central communications facility with said data transmission facility;
  rerouting, at said central communications facility, a data communication connection of said remote data terminal device with a remote data network in order to establish connectivity of said remote data terminal device with a test server;
  downloading from said test server to said remote data terminal device a test program comprising executable code corresponding to a selected one of a plurality of sets of input parameters each set optimized for testing a particular speed of data communication service, said executable code including an applet;
  transmitting from said remote data terminal device to said test server an upstream test signal;
  transmitting from said test server to said data terminal device a downstream test signal;
  providing, on said data terminal, a user interface with said test server including a browser;
  executing said applet on said data terminal to provide an indication of upstream and downstream data rates;
  displaying on said remote data terminal a performance of said data transmission facility in transmitting said upstream and downstream test signals including said upstream and downstream data rates, and
  transmitting an indication of said downstream and upstream data rates to said test server for storage thereon.

38. The method according to claim 37 further comprising a step of receiving packets from said remote data terminal and, in response, calculating a data rate.

39. The method according to claim 37 further comprising steps of calculating data rates of said upstream and downstream test signals.

40. The method according to claim 37 wherein said data transmission facility comprises a pair of ADSL Terminal Units connected by a communications link.

41. The method according to claim 40 wherein said communications link comprises twisted-pair.

42. The method according to claim 40 wherein said communications link comprises an SLIC.

43. The method according to claim 40 wherein said communications link comprises a DLC-SLIC.

44. The method according to claim 40 further comprising the steps of:

combining a telephone signal with said upstream and downstream test signal to form a composite signal;

splitting said composite signal to separate said telephone, upstream and downstream test signal; and providing said telephone signal to a voice switch and to a remote telephone terminal associated with said remote data terminal device.

\* \* \* \* \*